United States Patent Office 2,808,409
Patented Oct. 1, 1957

2,808,409

DITHIOPIPERAZINES

John J. D'Amico, Charleston, W. Va., assignor to Monsanto Chemical Company, St. Louis, Mo., a corporation of Delaware No Drawing. Application February 24, 1954, Serial No. 412,376

4 Claims. (Cl. 260—268)

This invention relates to a new class of compounds and to a method for their preparation. More particularly this invention relates to N,N'-dithio derivatives of an amine of the structure

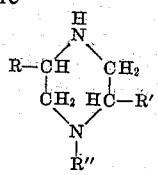

where R, R' and R'' are selected from a group consisting of hydrogen and hydrocarbon radicals.

The new compounds are conveniently prepared by condensing piperazine or a hydrocarbon substituted derivative thereof with sulfur monochloride. Sulfur monobromide can be substituted but of course is more expensive.

EXAMPLE 1

The reaction was carried out in a 2 liter 3-necked flask equipped with a mechanical stirrer, two dropping funnels, thermometer and ice bath. Into the reactor was charged a solution of 114 grams of 2,5-dimethyl piperazine in 1,000 ml. of trichloroethylene. The solution was cooled to about 5° C. and to it over a period of about an hour was added a solution of 67.4 grams of sulfur monochloride in 50 ml. of trichloroethylene. The contents of the reaction vessel were stirred vigorously during the addition and the temperature kept at 5°–10° C. Stirring was continued for 30 minutes at 10° C. and by-product hydrochloride salt neutralized by the addition of 160 grams of 25% aqueous sodium hydroxide and 400 ml. of water. The solids were then removed by filtration, washed with water until the washings were neutral to litmus and dried at 50° C. to obtain 67 grams of product M. P. 216–218° C. The compound had the empirical formula $C_{12}H_{24}N_4S_4$. Analysis gave 15.9% nitrogen and 37.5% sulfur as compared to calculated values of 15.9% nitrogen and 36.4% sulfur. The compound is insoluble in water and all common organic solvents from which properties coupled with the analysis the structural formula is believed to be

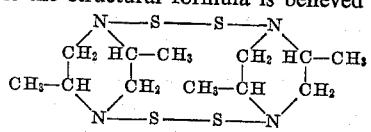

EXAMPLE 2

Substantially 50 parts by weight of piperazine was dissolved in 950 parts by weight of trichloroethylene and cooled to 10° C. A solution of 39 parts by weight of sulfur monochloride in 73 parts by weight of trichloroethylene was added gradually over a period of about 25 minutes while keeping the temperature of the reaction mixture at 10°–20° C. The reaction mixture was stirred vigorously throughout the addition and for 10 minutes longer at 10° C., then 92.8 parts by weight of 25% aqueous caustic soda added and the mixture stirred for 20 minutes. Another 39 parts by weight of sulfur monochloride in trichloroethylene were added concurrently with 92.8 parts by weight of 25% aqueous caustic soda at 10°–20° C. over a period of about 25 minutes and stirring continued for 10 minutes. The reaction mixture was then stirred with 250 parts by weight of water for 15 minutes, the solids filtered off, washed with water until the washings were neutral to litmus and dried to yield an N-thio piperazine, M. P. 218°–221° C., having the empirical formula $C_8H_{16}N_4S_4$ in a yield of 75.6% of the theoretical.

EXAMPLE 3

To a stirred solution containing 81.2 grams (0.5 mole) of 4-phenyl piperazine in 800 ml. of anhydrous ether was added dropwise 16.9 grams (0.125 mole) of sulfur monochloride dissolved in 50 ml. of anhydrous ether at 10°–15° C. over a 20 minute period. The ice bath was removed and the reaction mixture was stirred at room temperature for two hours. To the stirred reaction mixture 700 ml. of water was added and stirring continued for 15 minutes. Layers were separated, the ether layer was dried over $Na_2SO_4$ and the ether removed in vacuo. The product, a yellow colored solid, M. P. 100–105° C., was obtained in 82.7% yield. After recrystallization from acetone the 1,1'-dithiobis(4-phenyl piperazine) melted at 117–119° C. Analysis gave 14.45% nitrogen as compared to 14.49% nitrogen calculated for $C_{20}H_{26}N_4S_2$.

The new compounds are efficient accelerators and vulcanizing agents. For example the accelerating effect in natural rubber is illustrated by stocks A, B and C below. Stocks A and C were compounded from smoked sheets and stock B from pale crepe.

| Stock | | A | B | C |
|---|---|---|---|---|
| Rubber | parts by weight | 100 | 100 | 100 |
| Zinc oxide | do | 5 | 5 | 5 |
| Stearic acid | do | 1 | 1 | 1 |
| Sulfur | do | 3 | 3 | 3 |
| Product of Example 1 | do | 1 | | 0.7 |
| Product of Example 2 | do | | 1 | |
| Diphenyl guanidine | do | | | 0.3 |

The stocks so compounded were cured in a press in the usual manner by heating for 90 minutes at 275° F.

Table I

| Stock | Modulus of Elasticity in lbs./in.² at Elongation of 700% | Tensile at Break in lbs./in.² | Ultimate Elongation, Percent |
|---|---|---|---|
| A | 525 | 1,730 | 930 |
| B | 910 | 2,360 | 880 |
| C | 1,436 | 2,990 | 846 |

The new compounds are especially active for the vulcanization of Butyl rubber. Their properties are illustrated by stocks E and F below wherein the accelerating activity is compared to that of stock D containing tetramethyl thiuram disulfide, a widely used Butyl rubber accelerator.

| Stock | | D | E | F |
|---|---|---|---|---|
| Butyl rubber | parts by weight | 100 | 100 | 100 |
| Carbon black (Pelletex) | do | 54 | 54 | 54 |
| Zinc oxide | do | 5 | 5 | 5 |
| Stearic acid | do | 1 | 1 | 1 |
| Sulfur | do | 1.5 | 1.5 | 1.5 |
| Mercaptobenzothiazole | do | 0.5 | 0.5 | 0.5 |
| Tetramethyl thiuram disulfide | do | 1.0 | | |
| Product of Example 1 | do | | 1.0 | |
| Product of Example 2 | do | | | 1.0 |

These stocks were cured in the usual manner by heating for different periods of time in a press at 330° F. to obtain vulcanization exhibtiing the physical properties described below:

Table II

| Stock | Cure Time in Mins. | Modulus of Elasticity in lbs./in.² at Elongation of 300% | Tensile at Break in lbs./in.² | Ultimate Elongation, Percent |
|---|---|---|---|---|
| D | 60 | 1,145 | 1,450 | 420 |
| E | 60 | 900 | 1,553 | 513 |
| F | 60 | 1,025 | 1,520 | 485 |
| D | 90 | 1,055 | 1,495 | 500 |
| E | 90 | 935 | 1,595 | 540 |
| F | 90 | 1,150 | 1,600 | 470 |

The powerful vulcanizing action of the new compounds is illustrated by tests carried out in the following compositions:

| Stock | G | H | J |
|---|---|---|---|
| Smoked sheets parts by weight | 100 | 100 | 100 |
| Furnace carbon black do | 50 | 50 | 50 |
| Zinc oxide do | 5 | 5 | 5 |
| Saturated hydrocarbon softener do | 3 | 3 | 3 |
| Stearic acid do | 2 | 2 | 2 |
| Antioxidant do | 1.5 | 1.5 | |
| N-Cyclohexyl 2-benzothiazole sulfenamide do | 0.8 | 0.8 | 0.8 |
| Sulfur do | 2.5 | 2.5 | |
| Product of Example 1 do | | 3.3 | |
| Product of Example 3 do | | | 6.0 |

The stocks so compounded were cured by heating for 60 minutes at 291.2° F. to obtain vulcanizates having the physical properties described below:

Table III

| Stock | Modulus of Elasticity in lbs./in.² at Elongation of 300% | Tensile at Break in lbs./in.² | Ultimate Elongation, Percent |
|---|---|---|---|
| G | 2,383 | 3,946 | 453 |
| H | 2,345 | 3,920 | 475 |
| J | 1,746 | 3,733 | 533 |

The new compounds either as accelerators or vulcanizing agents are resistant to pre-vulcanization. For instance the uncured stock H was evaluated for resistance to pre-vulcanization by means of a Mooney plastometer at 275° F. The readings as compared to the control stock were as follows:

Table IV

| Stock | Mooney Plastometer Readings after Heating | | | | | | | | |
|---|---|---|---|---|---|---|---|---|---|
| | 4 minutes | 7 minutes | 8 minutes | 9 minutes | 10 minutes | 11 minutes | 12 minutes | 13 minutes | 14 minutes |
| G | 43 | 43 | 44 | 48 | 90 | 150 | | | |
| H | 49 | 49 | 49 | 49 | 49 | 50 | 53 | 64 | 85 |

It is intended to cover all changes and modifications of the examples of the invention herein chosen for purposes of disclosure which do not constitute departures from the spirit and scope of the invention. While the 2,5-dimethyl piperazine employed in Example 1 was essentially the trans isomer, the cis isomer can be employed just as readily.

What is claimed is:

1. The product obtained by condensing with formation of by-product hydrogen halide a sulfur halide selected from the group consisting of sulfur monochloride and sulfur monobromide and a piperazine of the structure

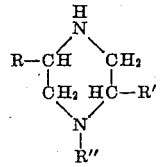

where R and R' are selected from a group consisting of hydrogen and lower alkyl groups and R'' is selected from a group consisting of hydrogen and phenyl groups.

2. A compound of the structure

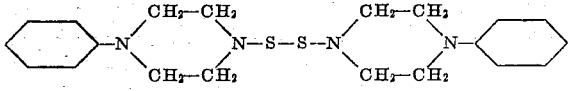

3. A product obtained by condensing with formation of by-product hydrogen chloride sulfur monochloride with piperazine.

4. A product obtained by condensing with formation of by-product hydrogen chloride sulfur monochloride with 2,5-dimethyl piperazine.

No references cited.